(12) United States Patent
Schneider

(10) Patent No.: US 6,892,656 B2
(45) Date of Patent: May 17, 2005

(54) SEED PLANTING ASSEMBLY AND LIQUID APPLICATION DEVICE FOR SAME

(75) Inventor: Jeffrey M. Schneider, Atlanta, GA (US)

(73) Assignee: AG-Solutions, Inc., Atlanta, GA (US)

( * ) Notice: Subject to any disclaimer, the term of this patent is extended or adjusted under 35 U.S.C. 154(b) by 106 days.

(21) Appl. No.: 10/313,555

(22) Filed: Dec. 6, 2002

(65) Prior Publication Data

US 2004/0149188 A1 Aug. 5, 2004

(51) Int. Cl.$^7$ .............................................. A01C 23/00
(52) U.S. Cl. ....................... 111/121; 111/127; 111/129; 111/900
(58) Field of Search ........................ 111/118, 119, 120, 111/121, 127, 129, 900, 905

(56) References Cited

U.S. PATENT DOCUMENTS

| | | | |
|---|---|---|---|
| 3,745,944 A | 7/1973 | Yetter et al. ................... 111/7 |
| 5,370,068 A | 12/1994 | Rawson et al. ............. 111/121 |
| 5,425,318 A | 6/1995 | Keeton ....................... 111/197 |
| 5,640,915 A | 6/1997 | Schaffert .................... 111/150 |
| 5,673,638 A | 10/1997 | Keeton ....................... 111/167 |
| 5,682,829 A | 11/1997 | Sukup ........................ 111/121 |
| 5,730,074 A | 3/1998 | Peter .......................... 111/118 |
| 5,752,453 A | 5/1998 | Nikkel et al. ............... 111/121 |
| 5,852,982 A | 12/1998 | Peter .......................... 111/118 |
| 5,862,763 A | 1/1999 | Dietrich, Sr. ............... 111/121 |
| 5,918,557 A | 7/1999 | Schaffert .................... 111/150 |
| 6,067,918 A | 5/2000 | Kirby ......................... 111/121 |
| 6,082,274 A | 7/2000 | Peter .......................... 111/118 |
| 6,082,275 A | 7/2000 | Schaffert .................... 111/150 |
| 6,095,065 A | 8/2000 | Dietrich, Sr. ............... 111/121 |
| 6,135,037 A | 10/2000 | Juptner ....................... 111/139 |
| 6,138,590 A | 10/2000 | Colburn, Jr. ............... 111/118 |
| 6,220,191 B1 | 4/2001 | Peter .......................... 111/118 |
| 6,283,050 B1 | 9/2001 | Schaffert .................... 111/150 |
| 6,289,829 B1 | 9/2001 | Fish et al. .................. 111/121 |
| 2002/0017389 A1 | 2/2002 | Moser et al. ............... 172/311 |

Primary Examiner—Christopher J. Novosad
(74) Attorney, Agent, or Firm—Thomas, Kayden, Horstemeyer & Risley, LLP

(57) ABSTRACT

A planning assembly and liquid application device for same having a furrow opening mechanism, a frame including a seed guide, a seed tube for directing seeds into a furrow, a liquid source, a liquid delivery conduit having a delivery end, and a furrow closing mechanism. The planting assembly also including a spray arm including a proximal end, a central portion, and a distal end, the proximal end being mounted to a second tube, the seed guide, or the frame, and the central portion extending rearwood such that the distal end is disposed above the furrow, and wherein the liquid delivery conduit is in fluid communication with the liquid source and the delivery end is adjacent to the distal end.

28 Claims, 17 Drawing Sheets

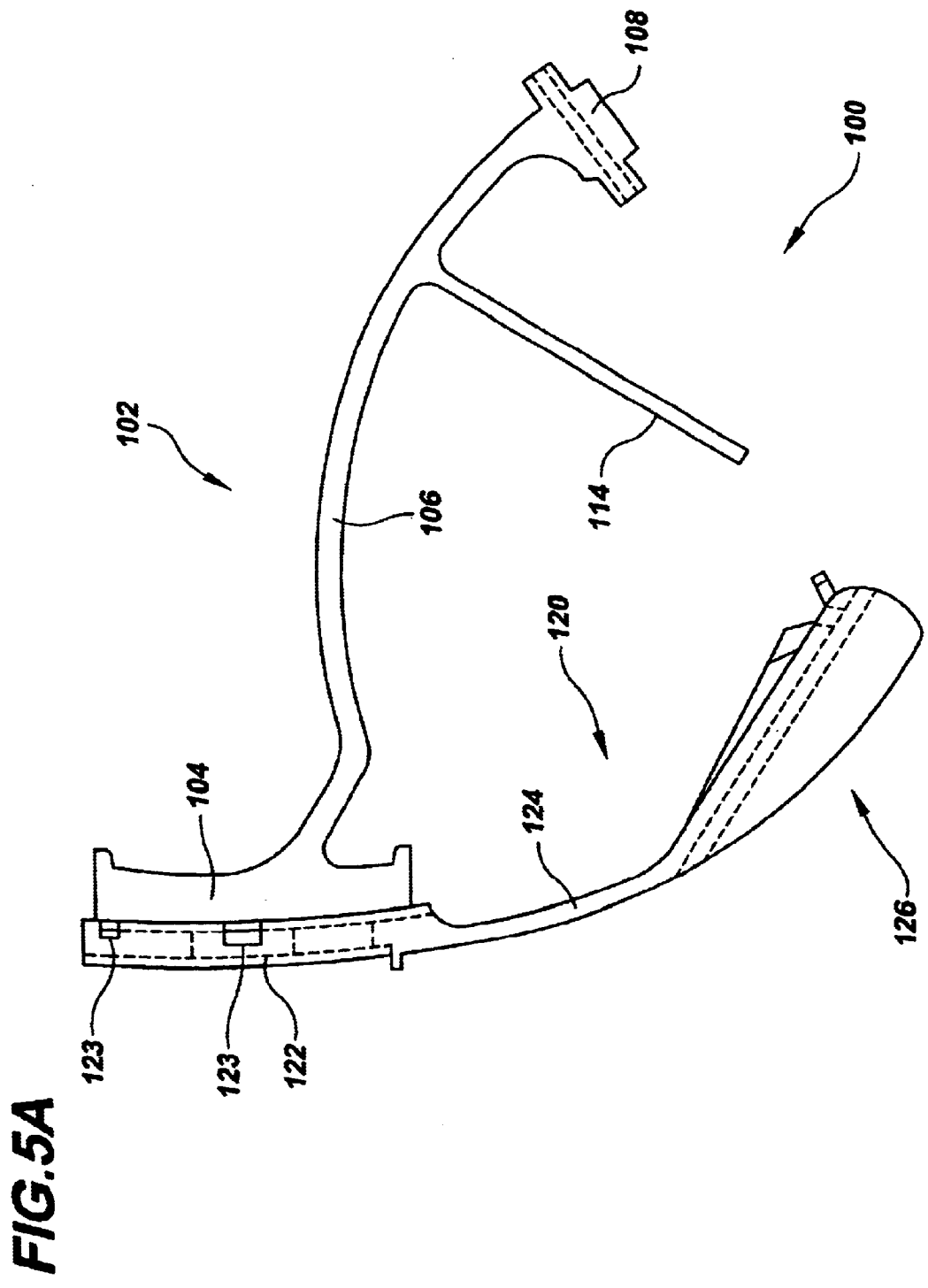

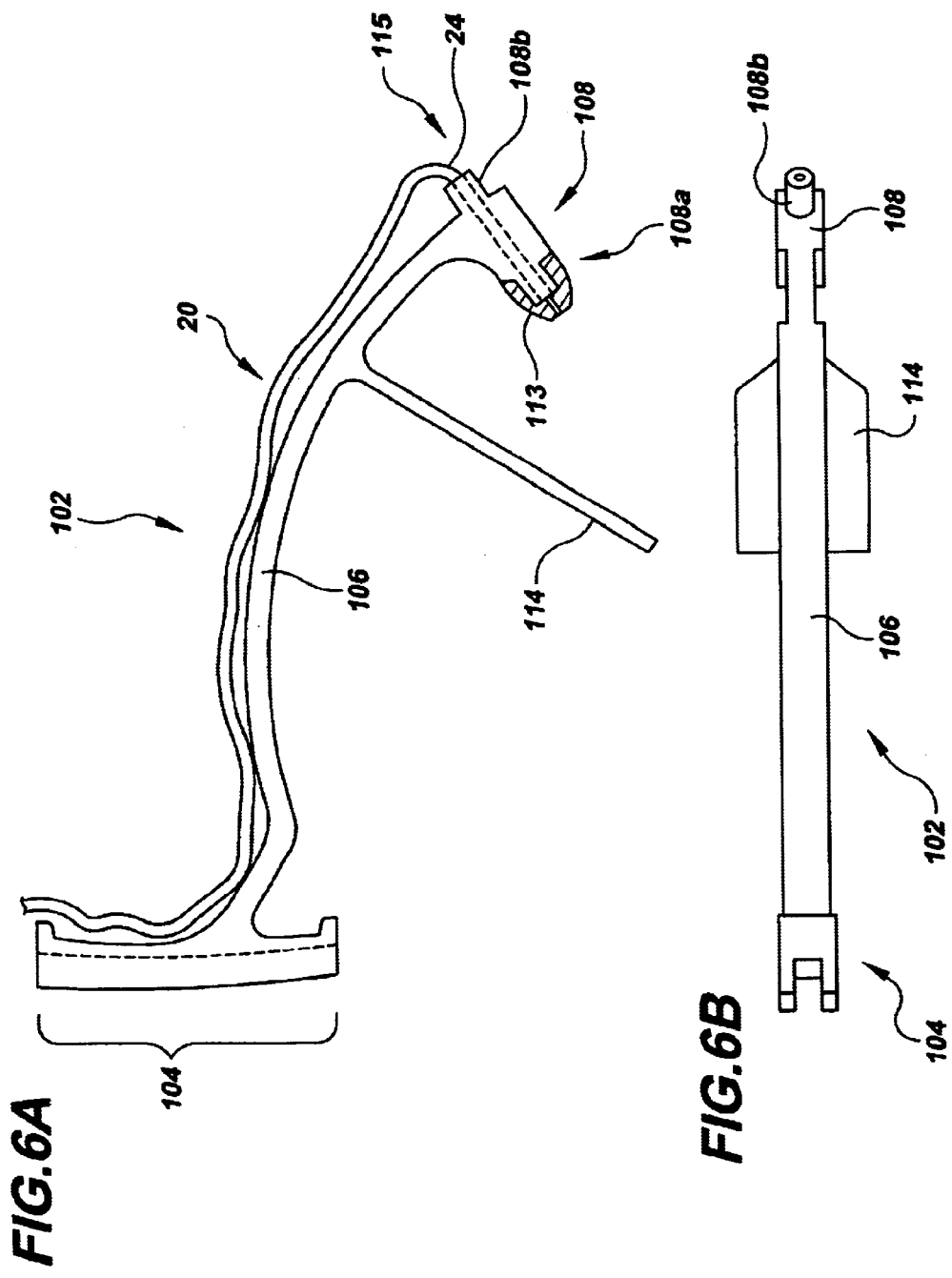

SEED PLANTING ASSEMBLY AND LIQUID APPLICATION DEVICE FOR SAME

TECHNICAL FIELD

The present invention generally relates to seed planting assemblies. More particularly, the invention relates to a device for conditioning a seed furrow and applying liquids to seeds dispensed into the furrow formed by the planting assembly.

BACKGROUND OF THE INVENTION

Multi-row planters are conventionally used for agricultural seed planting.

Typically, each planter includes multiple row units adapted for opening a seed furrow, depositing seeds within the furrow, and closing the seed furrow around the seeds. Additionally, it is well known to utilize pesticide, fertilizer, innoculant, etc., in both liquid and dry forms, as well as delivery devices in combination with the row units.

A known delivery device for delivering liquid products such as pesticides, fertilizers, innoculants, etc., into a furrow during operation of a typical planting assembly 10 is a drop tube 19a, as shown in FIG. 1. The typical planting assembly 10 includes a frame 11 that serves to support a seed hopper 16, a seed metering unit 18, a furrow opening mechanism 12, a gauge wheel assembly 28 that is pivotally connected to the frame 11 and provides various planting positions with respect to the furrow opening device 12, and a furrow closing device 26. As the planting assembly 10 is drawn across a field, the furrow opening mechanism 12 creates a furrow 160 to a depth dictated by the gauge wheel assembly 28. Seeds 166 are received from the seed hopper 16 and the seed metering unit 18, which determines the rate at which seeds 166 are delivered down a seed guide 14 to the seed tube 15, which directs the seeds 166 into the bottom of the furrow 160. The drop tube 19a delivers the desired liquid composition into the bottom of the furrow 160, and therefore onto each seed 166. To ensure the liquid composition is accurately administered to the seeds 166, typical drop tubes 19a have delivery end 24 disposed in close proximity to the furrow 160. As well, drop tubes 19a are frequently secured to the seed tube 15, meaning their delivery ends 24 are also located in close proximity to the furrow opening mechanism 12. As would be expected, furrow opening mechanisms 12 create a turbulent soil environment while opening the furrow 160. This can lead to blockage of the delivery end 24 of the drop tube 19a, and therefore result in inadequate application of the desired liquid composition into the furrow 160 and on the seeds 166. Also, the majority of liquid composition applied to the furrow 160 by the drop tube 19a is applied only to the bottom of the furrow 160, and not the side walls. When used with liquid pesticides, this can potentially result in inadequate protection for the seed 166 and its developing root ball, in that the root ball may extend beyond the zone of protection provided by the drop tube method of applying pesticides.

As shown in FIG. 2, another known device for delivering liquid pesticides and fertilizers is the spray tube 19b. Similar to the drop tube 19a, existing spray tubes 19b frequently have delivery ends 24 located in close proximity to the furrow 160. As such, it is possible for spray tubes 19b to experience clogging of their delivery end 24 and subsequent poor performance. As well, spray tubes 19b are frequently quite long. This can lead to problems in that during operation, the planting assembly 10 typically encounters obstructions such as rocks, debris, etc., and may therefore experience quite a bit of vibration, which is transmitted to the spray tubes 19b. Due to their length, it is not uncommon for the delivery end 24 of existing spray tubes 19b to vibrate erratically and therefore apply excess amounts of the liquid products outside of the furrow 160. This is generally disadvantageous since the pesticide and/or fertilizer may be transported by wind or run-off from rainfall, and does not serve to protect or nourish the seeds 166.

In recent years, some farmers have begun to use seed positioning devices with their planting assemblies 10. One such device is the REBOUNDER™ device disclosed in U.S. Pat. No. 5,640,915 and manufactured by Schaffert Manufacturing Company, Inc. As seeds 160 pass through the seed tube 15, it is possible for the seeds 166 to move within the seed tube 15 such that the seeds 166 leave the seed tube 15 in a direction other than that desired. Therefore, it is possible that a seed 166 could end up on a side wall of the furrow 160 rather than in the bottom, as desired. The REBOUNDER™ device 30a, which is attached to the seed tube 15, helps to position seeds 166 in the bottom of the furrow 160. As would be expected, it is still desirable to apply various liquids, such as fertilizers and pesticides, to those seeds 166 that are dispensed from the planting assembly 10 with the aid of the REBOUNDER™ device 30a.

As shown in FIG. 3, a liquid delivery conduit 20 can be attached to the seed positioning device 30a and/or the seed tube 15 such that the delivery end 24 of the liquid delivery conduit 20 extends slightly beyond the seed positioning device 30a. As such, the delivery end 24 of the liquid delivery conduit 20 is typically disposed in close proximity to, if not in, the furrow 160. As previously noted, positioning the delivery end 24 of a liquid delivery conduit 20 in close proximity to the furrow 160 can lead to clogging of the delivery end 24 and inadequate application of the liquid products. In addition, this method does not allow for the application of liquids in a wide and readily adjustable spray pattern, which is often desired.

Another popular seed positioning device used by farmers is the KEETON® seed firming attachment disclosed in U.S. Pat. No. 5,425,318. The KEETON® seed firming attachment 30b attaches to the seed tube 15 or seed guide 14 portion of the planting assembly 10 and presses seeds 166 into the bottom of the furrow 160 as it passes over them. The KEETON® seed firming device 30b attempts to place the seeds 166 at a desired depth within the furrow 160 and reduce air pockets about the seeds 166.

As shown in FIG. 4, liquid delivery conduits 20 can also be attached to the seed firming device 30b and/or seed tube so as to deliver liquids into the furrow 160. Again, the delivery end 24 of the liquid delivery conduit extends slightly beyond the seed firming device 30b, and is disposed in the furrow 160. As with other existing liquid delivery devices, by so positioning the delivery end 24 of the liquid delivery conduit 20, the delivery end 24 can be prone to clogging and misapplication of the liquid products.

Other potential problems arise from the use of existing seed positioning devices as well. For example, the potential exists for existing seed positioning devices 30a, 30b to position loose dirt and other materials existing in the furrow 160 on top of the seeds 166. By so doing, the seeds 166 and the portions of the furrow 160 in their direct vicinity are often not exposed to the direct application of the liquid products used, such as insecticides. As well, it is possible for existing seed positioning devices 30a, 30b to push the seeds 166 deeper into the furrow 160 than is desired. This similarly prevents the seeds 166 and portions of the furrow in their direct vicinity from receiving adequate amounts of the dispensed liquids.

From the foregoing, it can be appreciated that it would be desirable to have a planting assembly and liquid application device for same that uniformly distributes a desired amount of liquid into at least a portion of a furrow and onto the seeds. As well, it would be desirable if the liquid application device could be used alone or with various other attachments to the planter assembly, such as seed positioning devices.

SUMMARY OF THE INVENTION

Briefly described, a planting assembly and liquid application device for same provides an apparatus and method for distributing liquids into a furrow. An embodiment of the planting assembly has a frame, a furrow opening mechanism, a seed tube for directing seeds into a furrow, a liquid source, a liquid delivery conduit having a delivery end, and a furrow closing mechanism. The embodiment includes a spray arm having a proximal end configured for mounting to either the seed tube or the frame, a central portion, and a delivery end, the proximal end being mounted to either the seed tube or the frame and the central portion extending rearwardly such that the delivery end is disposed above the furrow. The liquid delivery conduit is in fluid communication with the liquid source and the delivery end of the liquid delivery conduit is adjacent to the distal end.

Another embodiment of the planting assembly has a furrow opening mechanism, a seed tube for directing a seed into a furrow having opposed sidewalls, a liquid source, a liquid delivery conduit having a delivery end, and a furrow closing mechanism. The embodiment includes a furrow conditioner removably secured to the seed tube, the furrow conditioner including a conditioning head having a first portion and a second portion that are substantially parallel and form a cavity. The first and second portions of the furrow conditioner contact adjacent of the opposed sidewalls of the furrow and the cavity is of sufficient size to prevent contact of the cavity with the seed in a bottom of the furrow.

Another embodiment of the planting assembly has a frame including a seed guide, a furrow opening mechanism, a seed tube for directing a seed into a furrow, a liquid source, a liquid delivery conduit having a delivery end, and a furrow closing mechanism. The embodiment includes a spray arm including a proximal end configured for mounting to a portion of the frame, a central portion, and a distal end, the proximal end being mounted to the frame and the central portion extending rearward such that the distal end is disposed above the furrow. The liquid delivery conduit is in fluid communication with the liquid source and the delivery end is adjacent to the distal end.

Another embodiment of the planting assembly has a frame including a seed guide, a furrow opening mechanism, a seed tube for directing seeds into a furrow having opposed sidewalls, a liquid source, a liquid delivery conduit having a delivery end, and a furrow closing mechanism. The embodiment includes a furrow conditioner removably secured to the frame, the furrow conditioner including a conditioning head having a first portion and a second portion that are substantially parallel and form a cavity. The first and second portions of the furrow conditioner contact adjacent of the opposed sidewalls of the furrow and the cavity is of sufficient size as to prevent contact of the cavity with the seed in a bottom of the furrow.

Another embodiment of the planting assembly has a frame including a seed guide, a seed positioning device, a seed tube for directing seeds into a furrow, a liquid source, and a liquid delivery conduit having a delivery end. The embodiment includes a spray arm including a proximal end and a distal end, the proximal end being adjacent to the seed positioning device and the distal end being disposed above the furrow. The liquid delivery conduit is in fluid communication with the liquid source and the delivery end is adjacent to the distal end.

The planting assembly and liquid application device for same can also be viewed as providing a method, of application of a liquid into a furrow. The method comprises the steps of providing a planting assembly having a furrow opening mechanism, a seed tube for directing a seed into the furrow, a liquid source, a liquid delivery conduit including a delivery end, and a furrow closing mechanism; forming the furrow with the planting assembly; directing the liquid downwardly and forwardly into at least a portion of the furrow aft of the seed tube, thereby applying the liquid to the seed and the furrow; and closing the furrow over the seed.

Another embodiment of the method of application of a liquid to a furrow comprises the steps of: providing a planting assembly having a furrow opening mechanism, a seed tube for directing a seed into the furrow, a seed positioning device, a liquid source, a liquid delivery conduit having a delivery end, and a furrow closing mechanism; providing a spray arm; attaching the spray arm to the see positioning device; forming the furrow with the planting assembly; directing the liquid into at least a portion of the furrow aft of the seed tube, thereby applying the liquid to the seed and the furrow; and closing the furrow over the seed.

Another embodiment of the present invention can also be viewed as providing a liquid application device for use with a planting assembly. The planting assembly has a furrow opening mechanism, a seed tube for directing a seed into a furrow, a liquid source, a liquid delivery conduit having a delivery end, and a furrow closing mechanism. The liquid application device has a spray arm including a proximal end configured for mounting to the seed tube, a central portion, and a distal end, the proximal end being mounted to the seed tube and the central portion extending rearward such that the distal end is disposed above the furrow. The liquid delivery conduit is in fluid communication with the liquid source and the delivery end is adjacent to the distal end of the spray arm.

Other systems, methods, features, and advantages of the present planting assembly and liquid application device for same will be or become apparent to one with skill in the art upon examination of the following drawings and detailed description. It is intended that all such additional systems, methods, features, and advantages be included within this description, be within the scope of the planting assembly and liquid application device for same, and be protected by the accompanying claims.

BRIEF DESCRIPTION OF THE DRAWINGS

The planting assembly and liquid application device for same can be better understood with reference to the following drawings. The components in the drawings arc not necessarily to scale, emphasis instead being placed upon clearly illustrating the principles of the planting assembly and liquid application device for same. Moreover, in the drawings, like reference numerals designate corresponding parts throughout the several views.

FIGS. 5A and 5B are side views of preferred embodiments of a liquid application devices according to the present invention.

FIGS. 6A and 6B are side and top views, respectively, of a portion of a preferred embodiment of a liquid application device according to the present invention.

Figure 1:
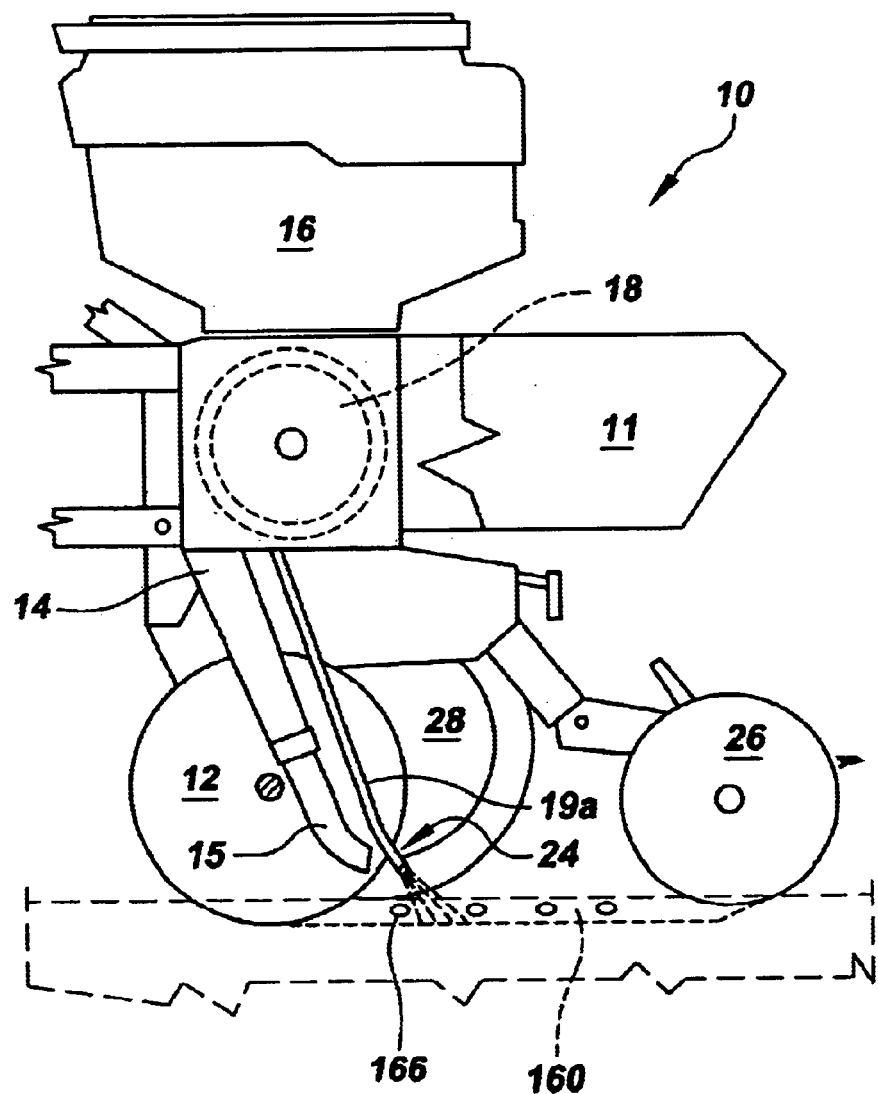
FIG. 1 is a side view of a planting assembly including an existing liquid application device.
Figure 2:
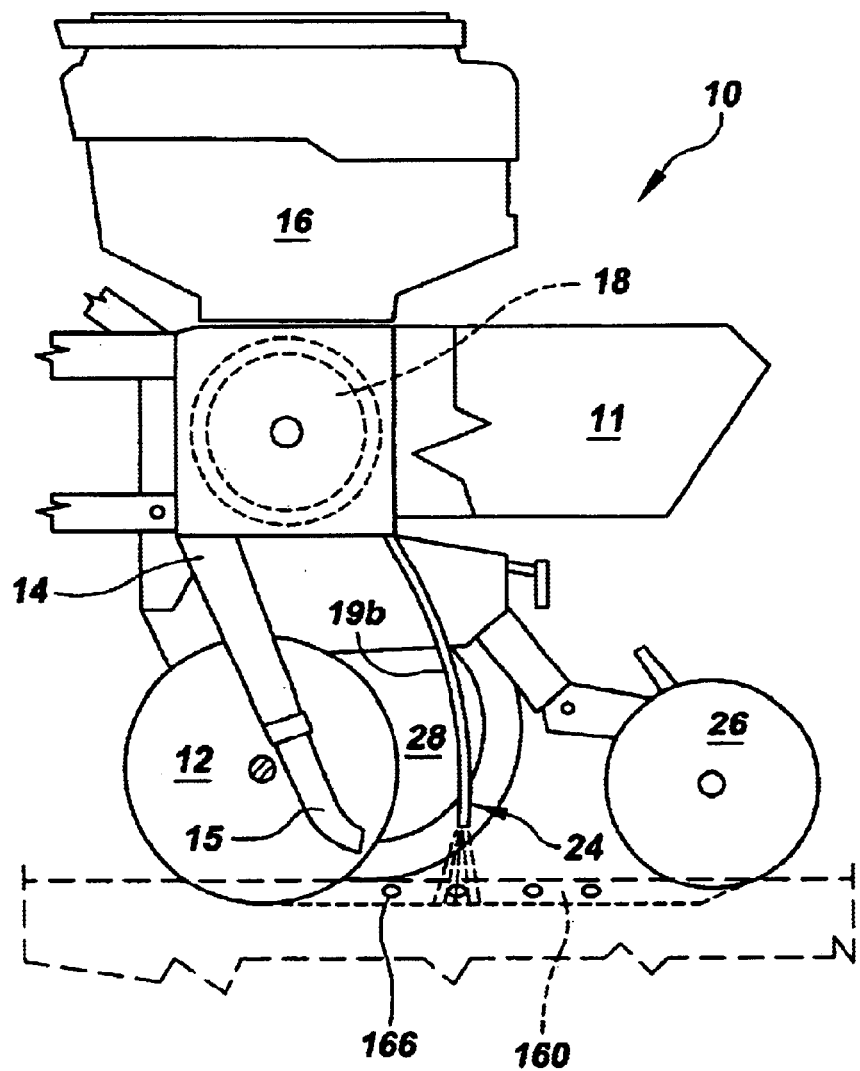
FIG. 2 is a side view of a planting assembly including an existing liquid application device.

Reference will now be made in detail to the description of the planting assembly and liquid application device for same as illustrated in the drawings. While the planting assembly and liquid application device for same will be described in connection with these drawings, there is no intent to limit the planting assembly and liquid application device for same to the embodiment or embodiments disclosed therein. On the contrary, the intent is to cover all alternatives, modifications, and equivalents included within the spirit and scope of the planting assembly and liquid application device for same as defined by the appended claims.

DETAILED DESCRIPTION OF THE PREFERRED EMBODIMENT

Figure 8A:
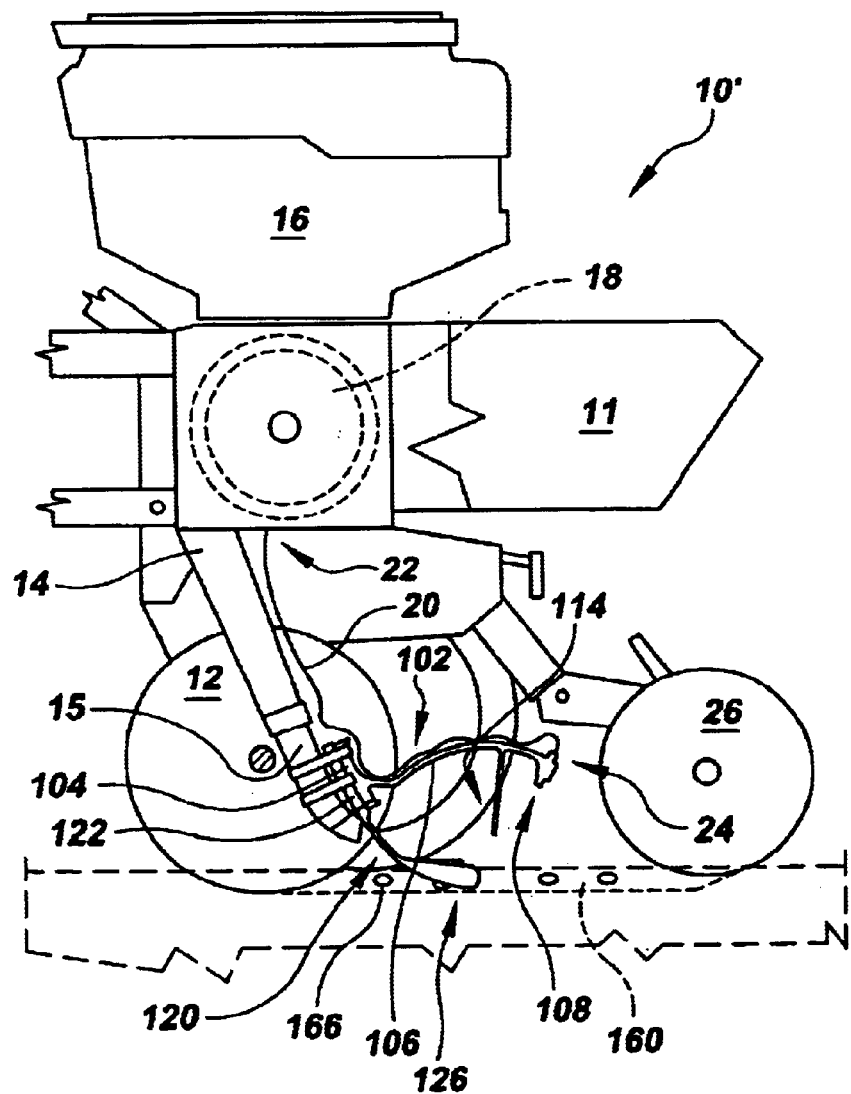
FIGS. 8A and 8B are side views of a planting assembly including a preferred embodiment of a liquid application device according to the present invention.

Referring now in more detail to the drawings, FIG. 5A illustrates a preferred embodiment of a liquid application device configured for attachment to a planting assembly 10' (FIG. 8A). As shown, the liquid application device 100 includes a spray arm 102 and a furrow conditioner 120. The furrow conditioner 120 includes an attachment end 122 configured for attachment to a seed tube 15 of the planting assembly 10', a central portion 124, and a conditioning head 126 which is disposed in a furrow 160 (FIG. 9A) formed by the planting assembly 10'. As shown, the spray arm 102 includes a proximal end 104 configured for mounting to either the attachment end 122 of the furrow conditioner 120 or the seed tube 15 of the planting device 10', a central portion 106, a distal end 108, and a deflector shield 114. Preferably, the central portion 106 of the spray arm 102 is configured so as to support the distal end 108 an adequate distance above the furrow 160, thereby preventing the turbulence of dirt and debris within the furrow 160 from interfering with liquid application operations and allowing for a wide spray pattern if necessary. As well, the deflector shield 114 is disposed on the central portion 106 of the spray arm 102 to prevent dirt and debris kicked up by the planting assembly 10' from reaching the distal end 108 of the spray arm. Note, embodiments of both the spray arm 102 and furrow conditioner 120 are envisioned wherein the proximal end 104 and attachment end 122, respectively, are configured for attachment to the seed guide 14 portion of the frame 11. As well, the proximal end 104 and attachment end 122 can be connected to a mounting bracket (not shown) which is connected to the frame 11 of the planting assembly 10'.

FIGS. 6A and 6B show side and top views, respectively, of the spray arm 102 as shown in FIG. 5A. Preferably, some embodiments of the spray arm 102 include threaded portions 108a, 108b on the distal end 108. Threaded portion 108a can be used to attach various nozzles 113 (shown in cross-section) to the distal end 108 to adjust spray patterns. Threaded portion 108b can be used to connect the delivery end 24 of a fluid delivery conduit 20 to the distal end 108, thereby aligning the fluid delivery conduit with fluid passage 115 and subsequently the spray nozzle.

Figure 7B:
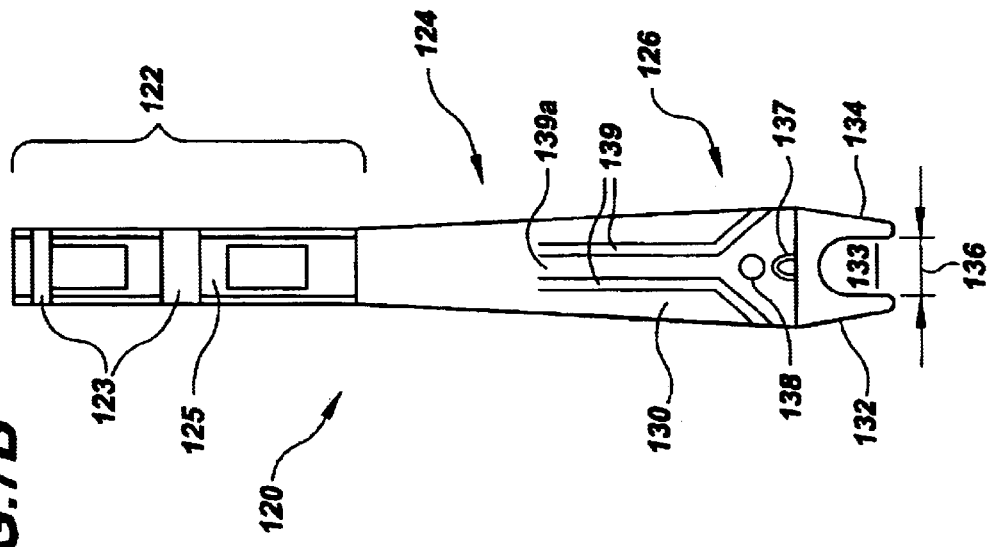
FIGS. 7A and 7B are side and rear views, respectively, of a portion of a preferred embodiment of a liquid application device according to the present invention.
Figure 7A:
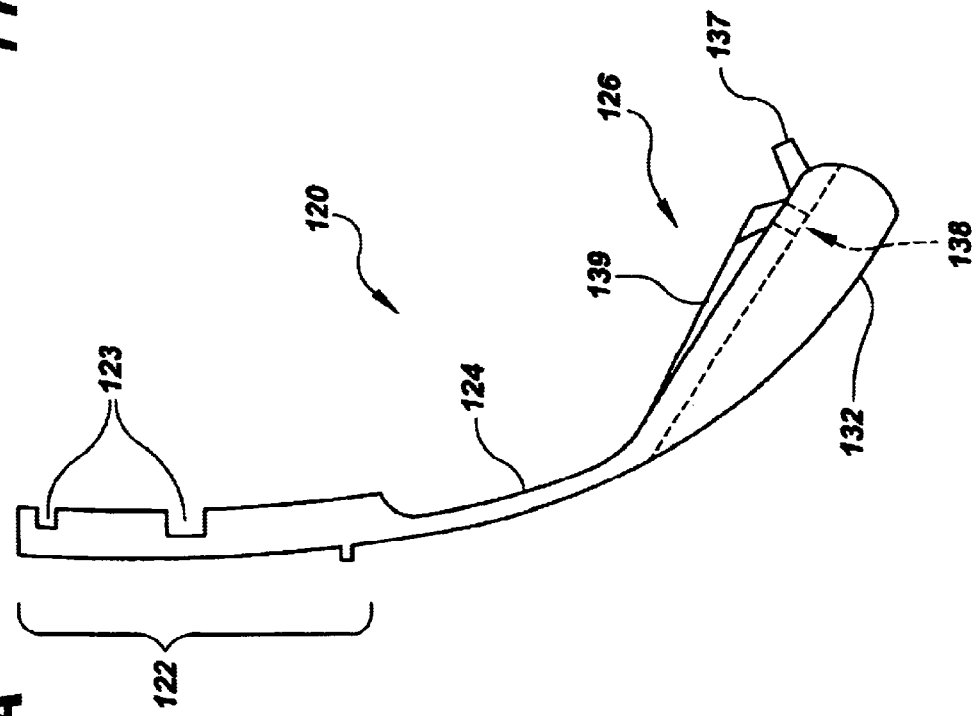
Figure 8B:
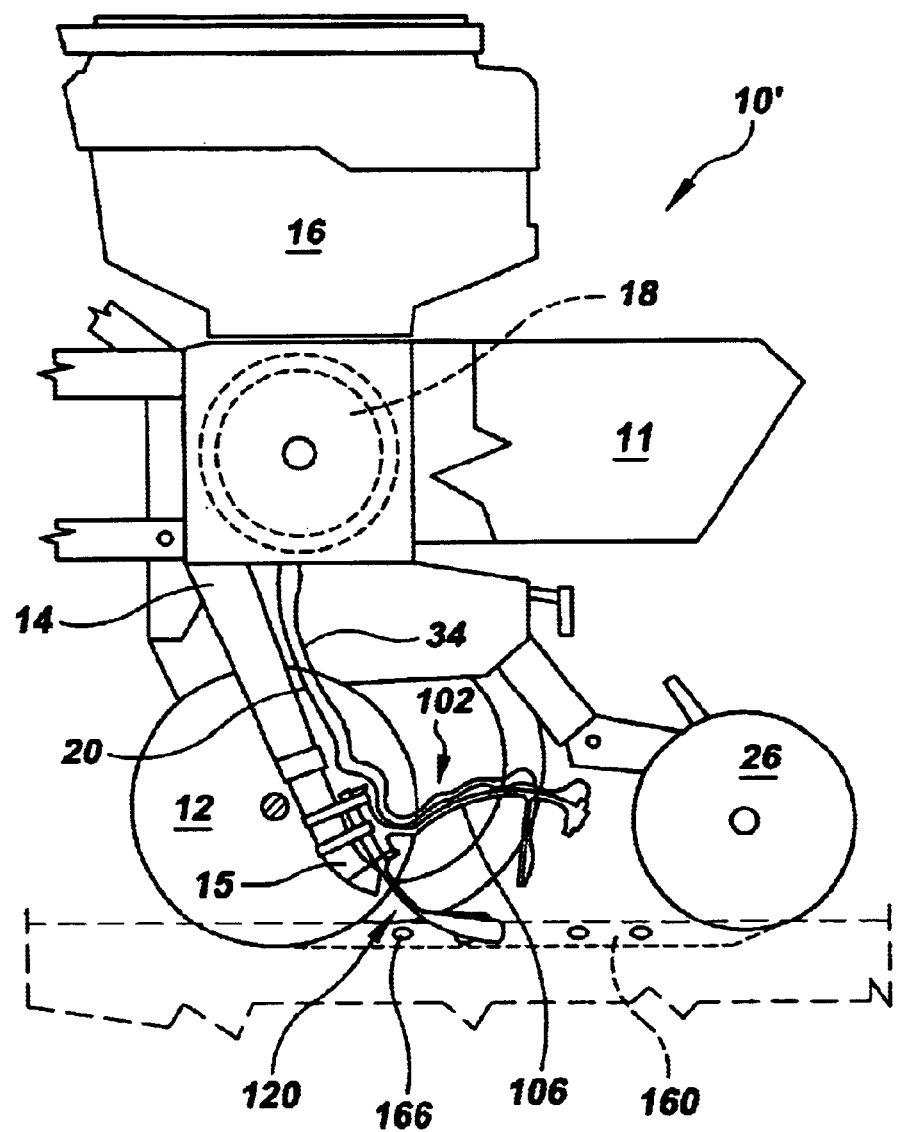
Figure 9A:
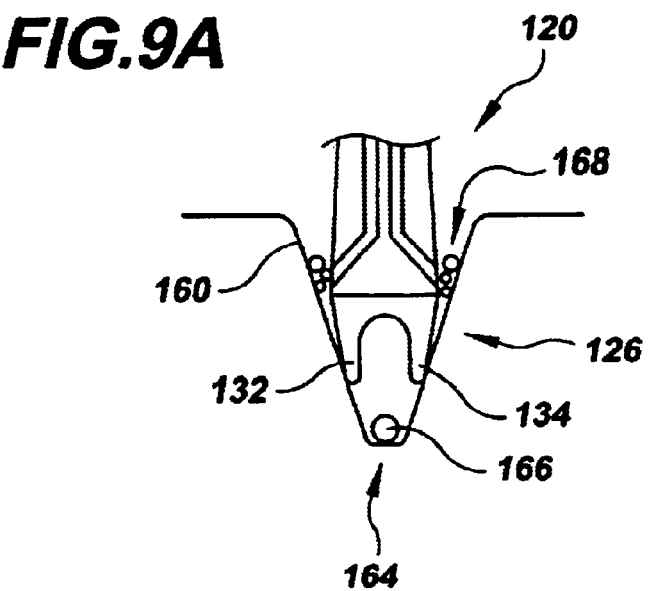
FIGS. 9A–9C are sequential drawings of a furrow as formed by a planting assembly including a preferred embodiment of a liquid application device according to the present invention.
Figure 9B:
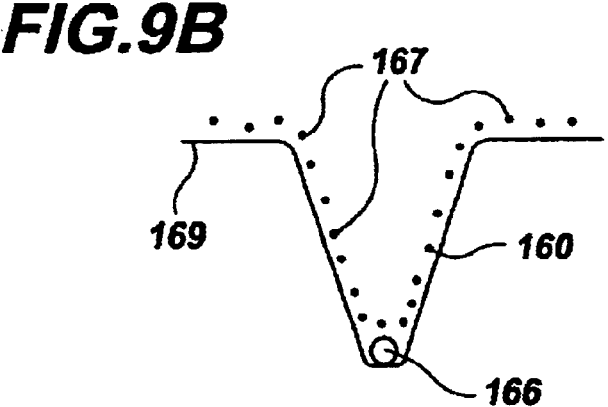

FIGS. 7A and 7B show side and rear views, respectively, of the furrow conditioner 120, as shown in FIG. 5A. Preferably, the furrow conditioner 120 includes attachment slots 123 for attaching the furrow conditioner 120 to the seed tube 15 of a planting assembly 10' (FIG. 8). As well, the attachment end 122 includes a mounting receptacle 125 configured to securely receive the proximal end 104 of the spray arm 102, as shown in FIG. 5A. Preferably, the conditioning head 126 of the furrow conditioner 120 includes a top portion 130 that connects a first portion 132 and a second portion 134 of the conditioning head 126, as well as a pair of opposed ridges 139 that form a channel 139a for receiving a liquid delivery conduit (not shown). Preferably, both an aperture 138 and a mounting tab 137 are provided to receive the delivery end of the liquid delivery conduit. As such, the liquid delivery conduit may either pass through the aperture 138 or simply extend beyond the conditioning head and be secured in place by a mounting tab 137. The first and second portions 132, 134 are separated by first distance 136 selected such that the first and second portions 132, 134 can traverse the length of a furrow 160 without disturbing the seeds 166 disposed in the bottom of the furrow 160, as shown in FIG. 9A. As the conditioning head 126 travels the length of the furrow 160, the first and second portions 132, 134 form a cavity 133 that allows the conditioning head 126 to "straddle" the seeds 166 disposed in the bottom 164 of the furrow 160. Note, the cavity 133 can have any number of cross-sectional shapes, such as U-shaped, half-oval, half-circle, angular, etc. The first and second portions 132, 134 are arranged and configured such that they prevent loose dirt and debris 168 that results both from formation of the furrow 160 by the furrow opening mechanism 12 and from vibration of the planting assembly 10' from falling to the bottom 164 of the furrow 160, thereby partially covering up the seeds 166. As such, the furrow conditioner 120 ensures that the seed 166 remains exposed within the furrow, thereby meaning adequate application of desired liquids both directly onto the seeds 160 and into the furrow 160 adjacent the seeds 166 is possible, as shown in FIG. 9B.

As shown in FIG. 8A, both the furrow conditioner 120 and spray arm 102 of a preferred embodiment of the liquid application device 100 are typically attached to the seed tube of a planting assembly 10'. Plastic ties, metal bands, etc. all function as adequate means of attaching the spray arm 102 and the furrow conditioner 120 to the seed tube 4. During operation, the conditioning head 126 of the furrow conditioner 120 is disposed in the furrow 160, thereby preventing dirt and debris from covering the seeds 166 before the appropriate liquids are dispensed. The spray arm 102 extends rearwardly toward the furrow closing mechanism 26, thereby positioning the distal end 108 of the spray arm 102 both above the furrow 160 and adequately aft of the furrow opening mechanism 12 to avoid airborne dirt and debris caused by the planting assembly 10'. Preferably, a liquid delivery conduit 20 has a first end 22 in fluid communication with a liquid source (not shown) located on the planting assembly 10' and a delivery end 24 disposed on the distal end 108 of the spray arm 102. So positioned, the delivery end 24 of the liquid delivery conduit 20 can deliver liquid pesticides and/or fertilizers, for instance, without the delivery end 24 becoming clogged by dirt and debris. To further insure proper operation, a deflector shield 114 is disposed on the central portion 106 of the spray arm 102 between the furrow opening mechanism 12 and the distal end 108 of the spray arm.

Figure 9C:
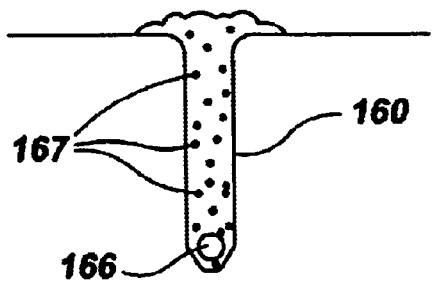

Preferably, the distal end 108 of the spray arm is configured such that the delivery end 24 sprays liquid into the furrow 160 in a direction that is slightly forward of vertical. By spraying the liquid into the furrow 160 in a slightly forward direction, the operator insures that the liquid is applied to the furrow 160 in a predictable manner. Ideally, the dispensed liquid, such as pesticide, will be applied to the furrow 160 in a "T-band" spray pattern of approximately 5 to 7 inches in width. To assist in achieving this pattern, a spray nozzle (not shown) is preferably included on the distal end 108 of the spray arm 102 in fluid communication with the delivery end 24 of the liquid delivery conduit 20. A desired "T-Band" distribution of liquid within the furrow 160 and on the seeds 166 is shown in FIG. 9B. Note that in FIG. 9B, the desired distribution includes spraying at least a portion of the liquid onto the upper surface 169 of the soil surrounding the furrow 160. Other preferred embodiments include distributing the liquid into only the furrow 160. After the desired liquids have been applied to the furrow 160, the furrow closing mechanism 26 closes the furrow above the seeds 166, as shown in FIG. 9C.

The liquid application device 100, as shown in FIG. 8A, can be modified such that two different liquids, for example, pesticide and fertilizer, can be applied to the furrow 160 simultaneously. The liquid application device 100 shown in FIG. 8B includes a second liquid delivery conduit 34 that runs along the central portion 106 of the spray arm 102 and is connected to the deflector shield 114 on the side disposed toward the furrow closing mechanism 26. As such, the second liquid delivery conduit 34 is also protected from dirt and debris by the deflector shield 114, and can be used to apply liquids into the furrow 160.

Figure 10A:
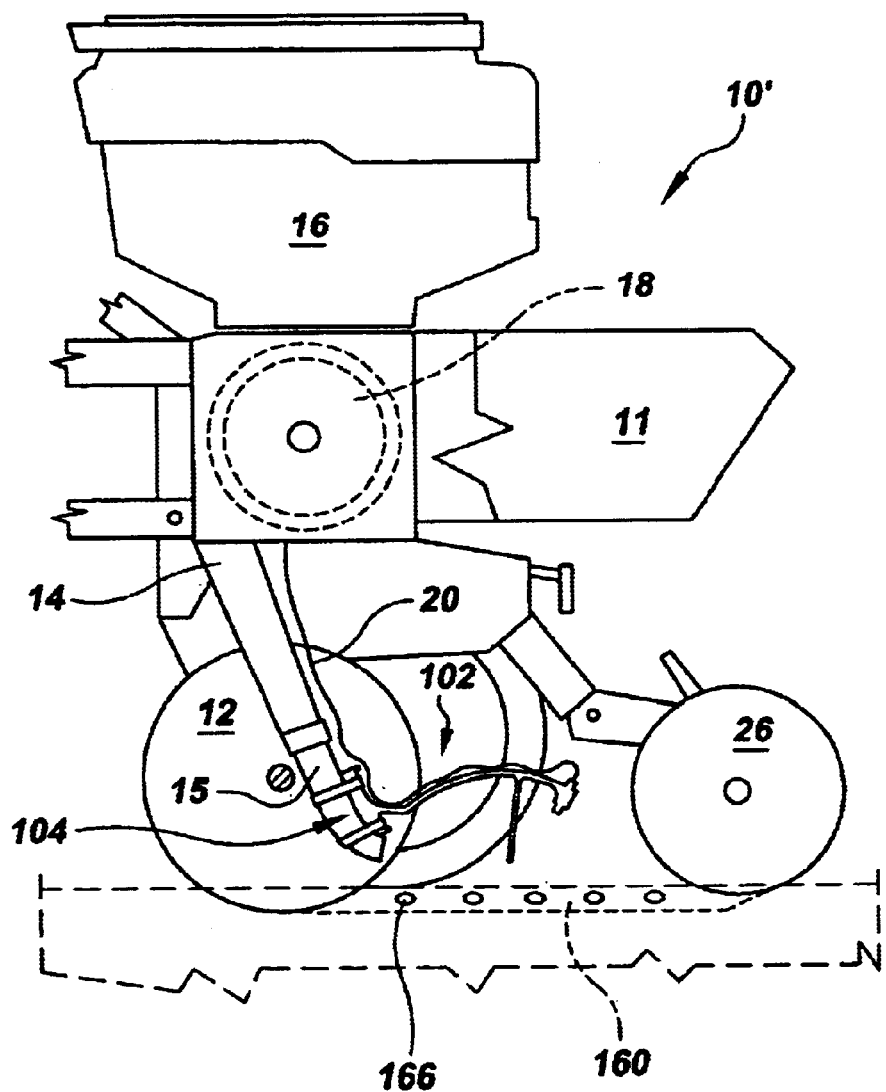
FIGS. 10A through 10C are side views of a planting assembly including a preferred embodiment of a liquid application device according to the present invention.
Figure 10B:
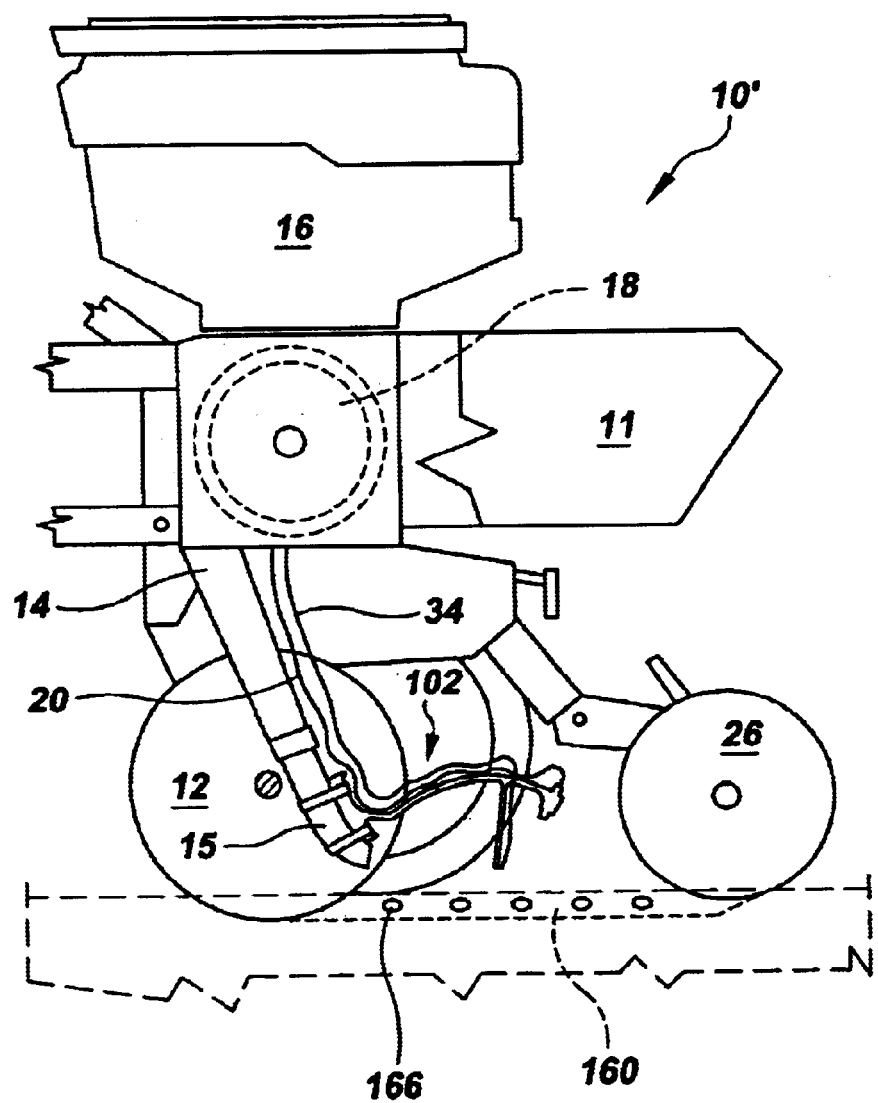
Figure 10C:
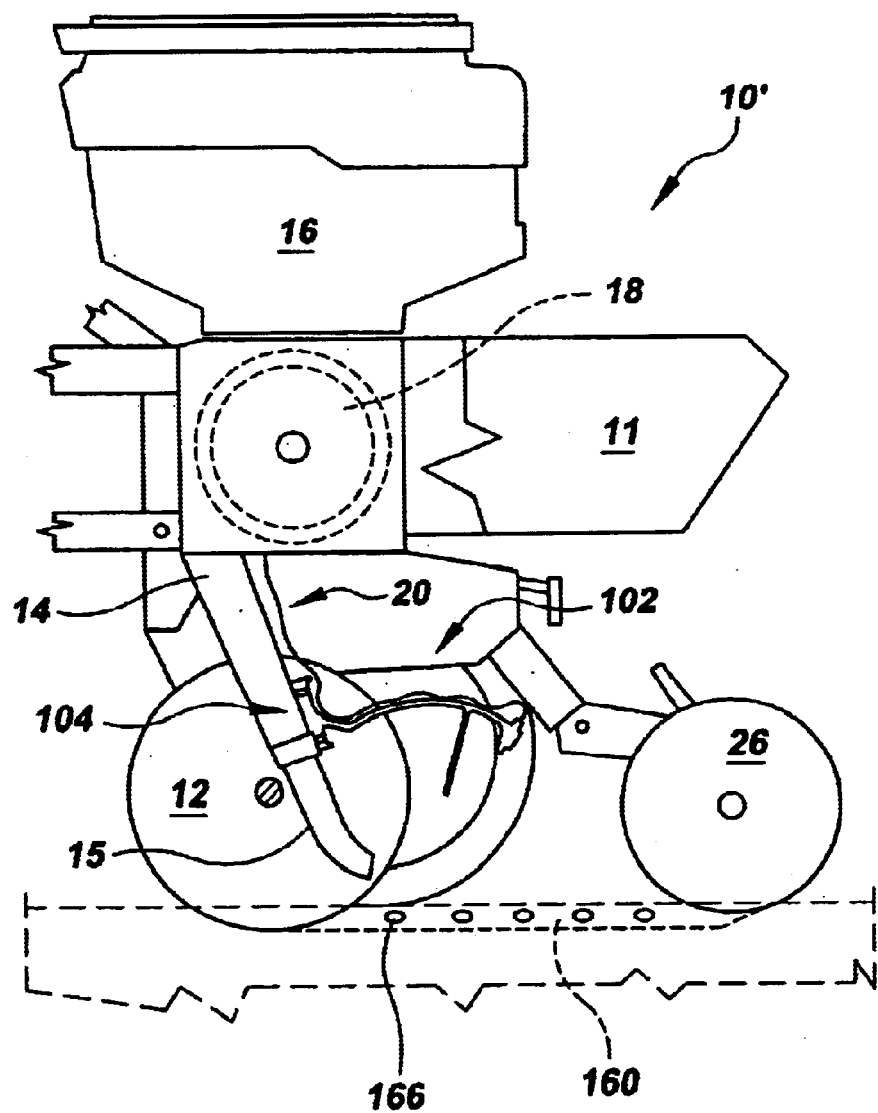

As shown in FIGS. 10A and 10B, preferred embodiments of the present liquid application device 100 allow the spray arm 102 and the furrow conditioner 120 to be used independently of each other. When the spray arm 102 is used independently of the furrow conditioner 120, the proximal end 104 is normally mounted directly to the seed tube 15. As previously noted, plastic ties, metal bands, etc., are sufficient for mounting the spray arm 102 to the seed tube 15. However, other embodiments include a proximal end 104 configured for attachment to the seed guide 14 portion of the frame 11 (as shown in FIG. 10C). As before, when used independently, the spray arm 102 can also include a second liquid delivery conduit 34 for simultaneously delivering a second desired liquid to the furrow.

Figure 11:
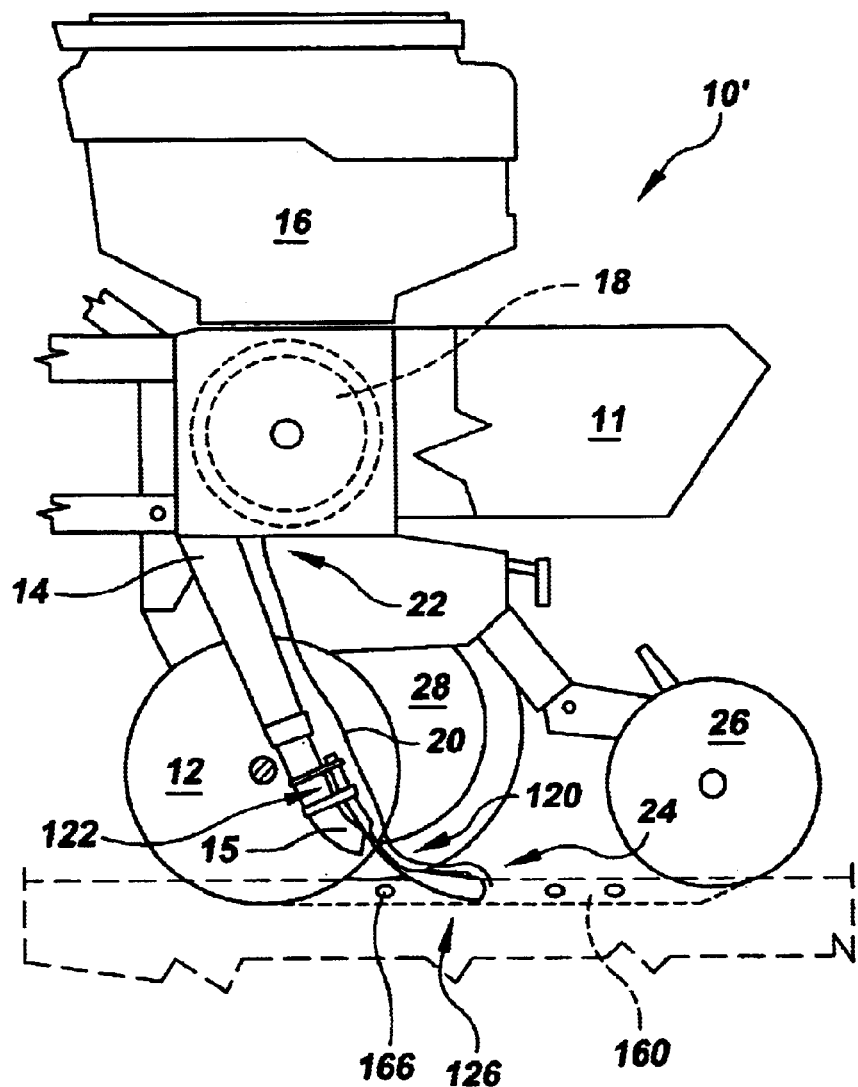
FIG. 11 is a side view of a planting assembly including a preferred embodiment of a liquid application device according to the present invention.

As shown in FIG. 11, the furrow conditioner 120 can be used independently of the spray arm 102. When used in an independent fashion, the liquid delivery conduit 20 runs along the furrow conditioner 120 such that its delivery end 24 is disposed slightly beyond the conditioning head 126. In this manner, desired liquids can be applied directly into the furrow 160.

Figure 3:
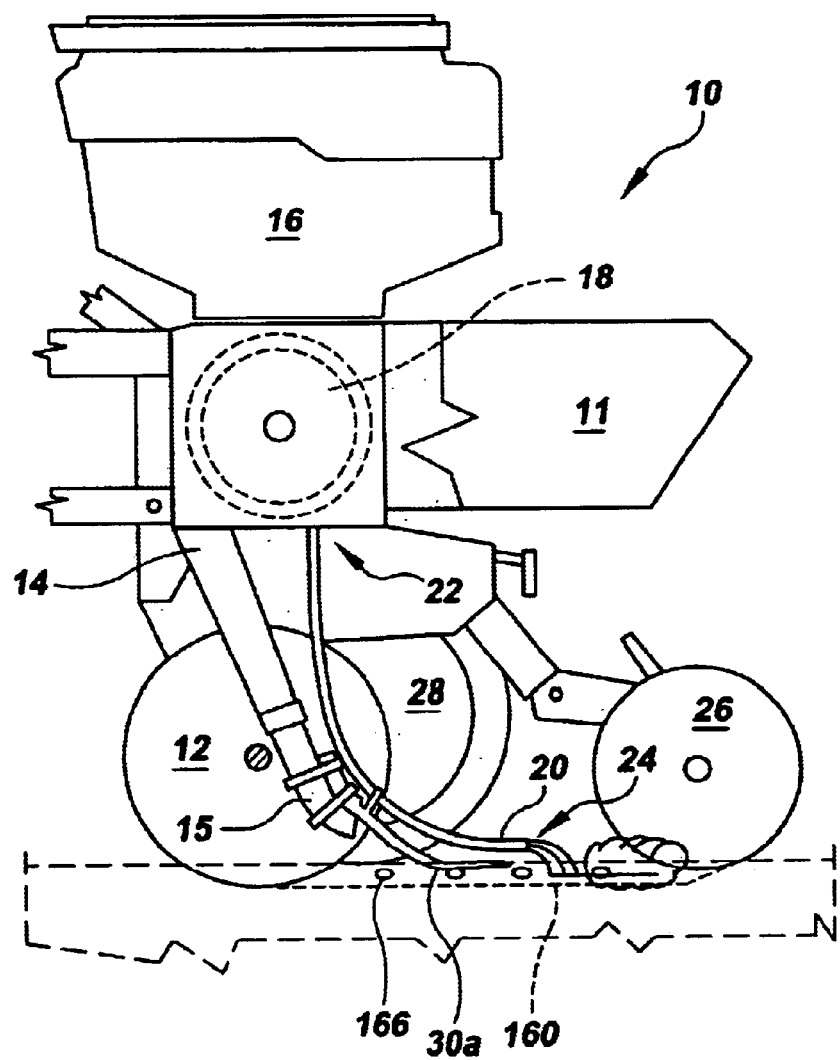
FIG. 3 is a side view of a planting assembly including an existing seed positioning device and an existing liquid application device.
Figure 4:
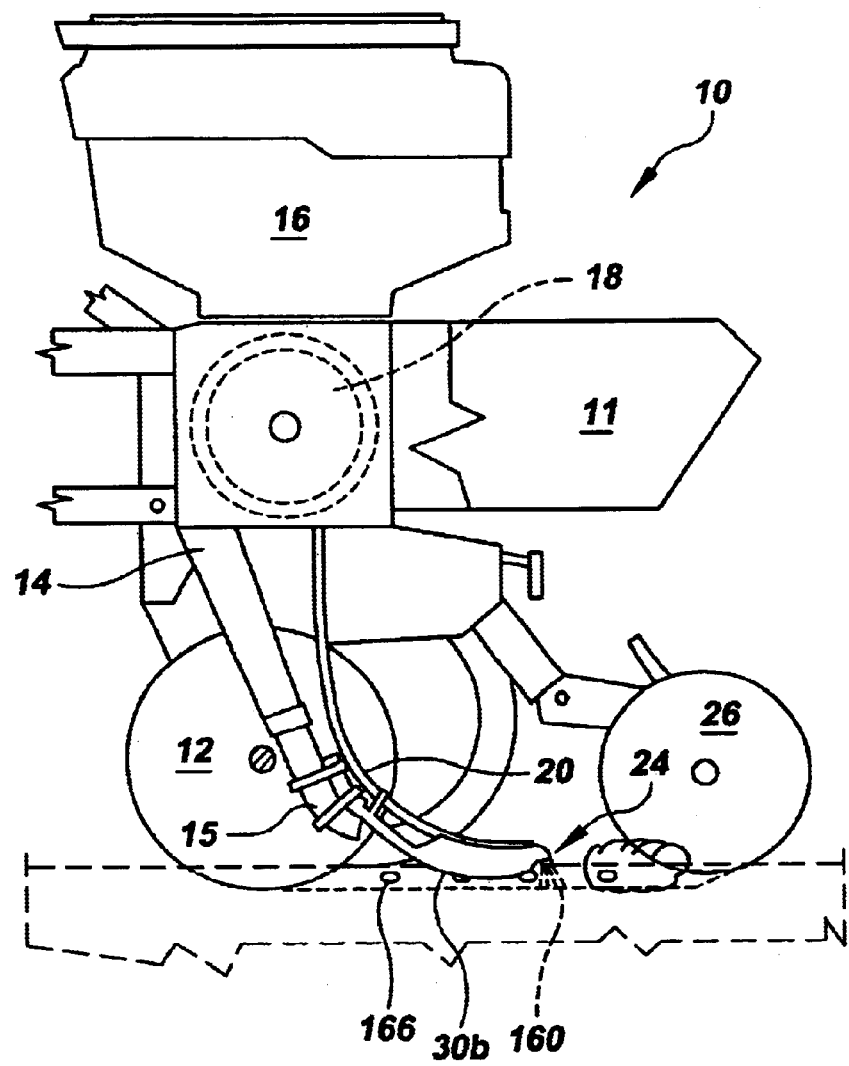
FIG. 4 is a side view of a planting assembly including an existing seed positioning device and an existing liquid application device.
Figure 12:
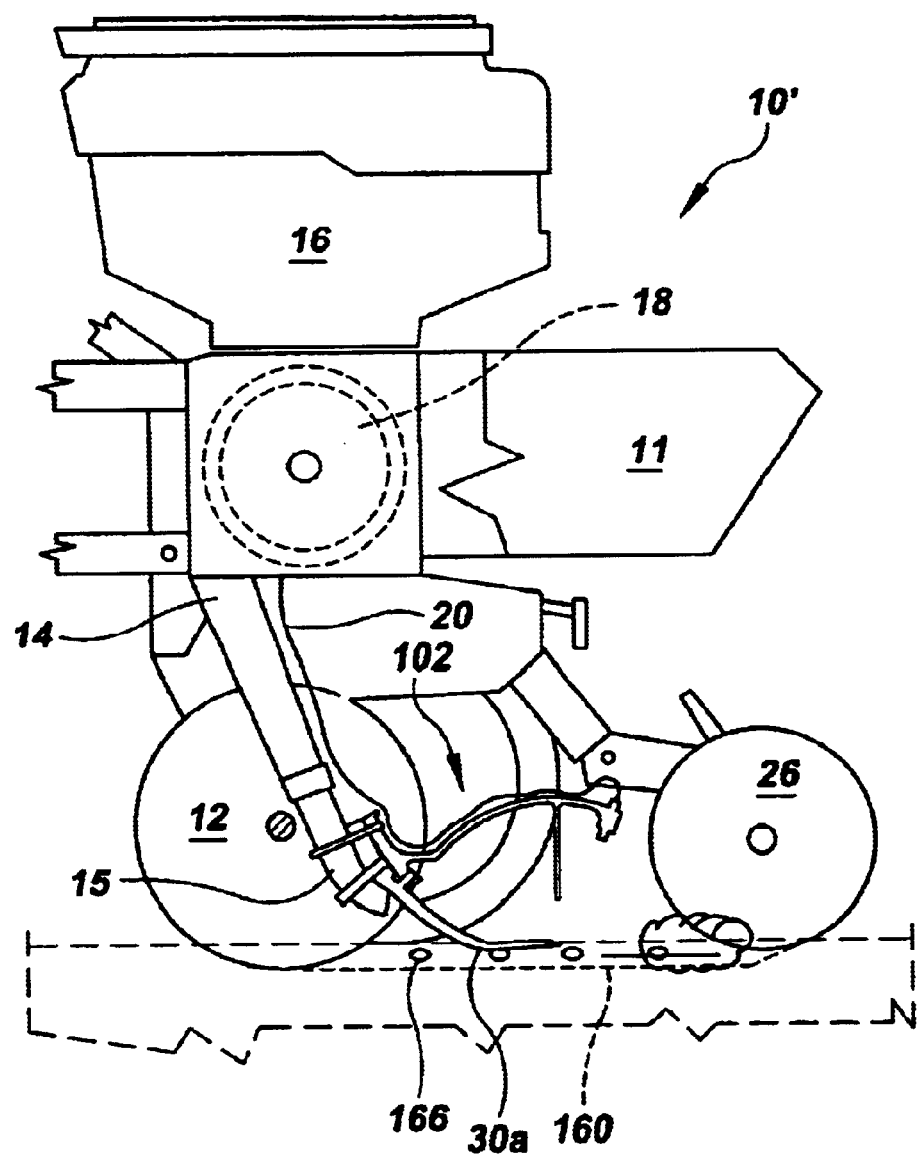
FIG. 12 is a side view of a planting assembly including the liquid application device as shown in FIG. 10A as used with an existing seed positioning device.
Figure 13:
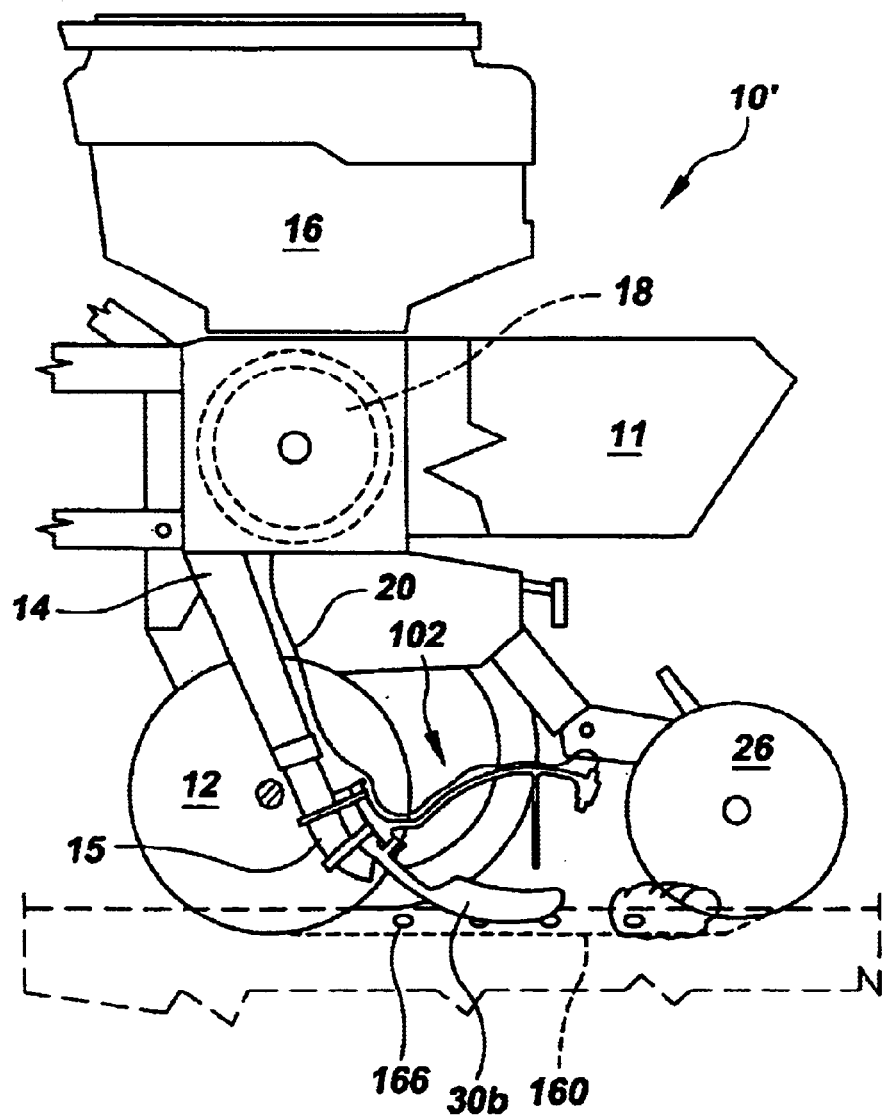
FIG. 13 is a side view of a planting assembly including the liquid application device as shown in FIG. 10A as used with an existing seed positioning device.

As previously noted, many planting assemblies include seed positioning devices, such as the REBOUNDER™ 30a and the KEETON® seed firmer 30b, as shown in FIGS. 12 and 13, respectively. Operators of planting assemblies 10' that include the seed positioning devices 30a, 30b may wish to avoid the previously noted problems that are frequently encountered while using existing devices for the applications of liquid in tandem with seed positioning devices 30a, 30b. As such, preferred embodiments of the spray arm 102 of the present liquid application device 100 can be used with these devices 30a, 30b. Embodiments of the present invention are envisioned wherein the spray arm 102 is independently attached to the seed positioning devices 30a, 30b, as well as formed integrally therewith as part of a one-piece construction. Unlike the existing liquid application devices, as shown in FIGS. 3 and 4, preferred embodiments of the spray arm 102 position the delivery end 24 of the liquid delivery conduit 20 at an adequate height above the furrow 160, such that clogging of the delivery end 24 by dirt and debris can be minimized and a wide spray pattern can be achieved if desired. As previously noted, preferred embodiments of the spray arm 102 exist wherein the delivery end 24 is positioned above the furrow so as to direct liquids into only the furrow 160 or across the entire width of the furrow 160 and onto a portion of the soil surface surrounding the furrow 160. As well, multiple embodiments of the spray arm 102 are envisioned such that the spray arm 102 can accommodate varying lengths of seed positioning devices 30a, 30b.

Figure 5B:
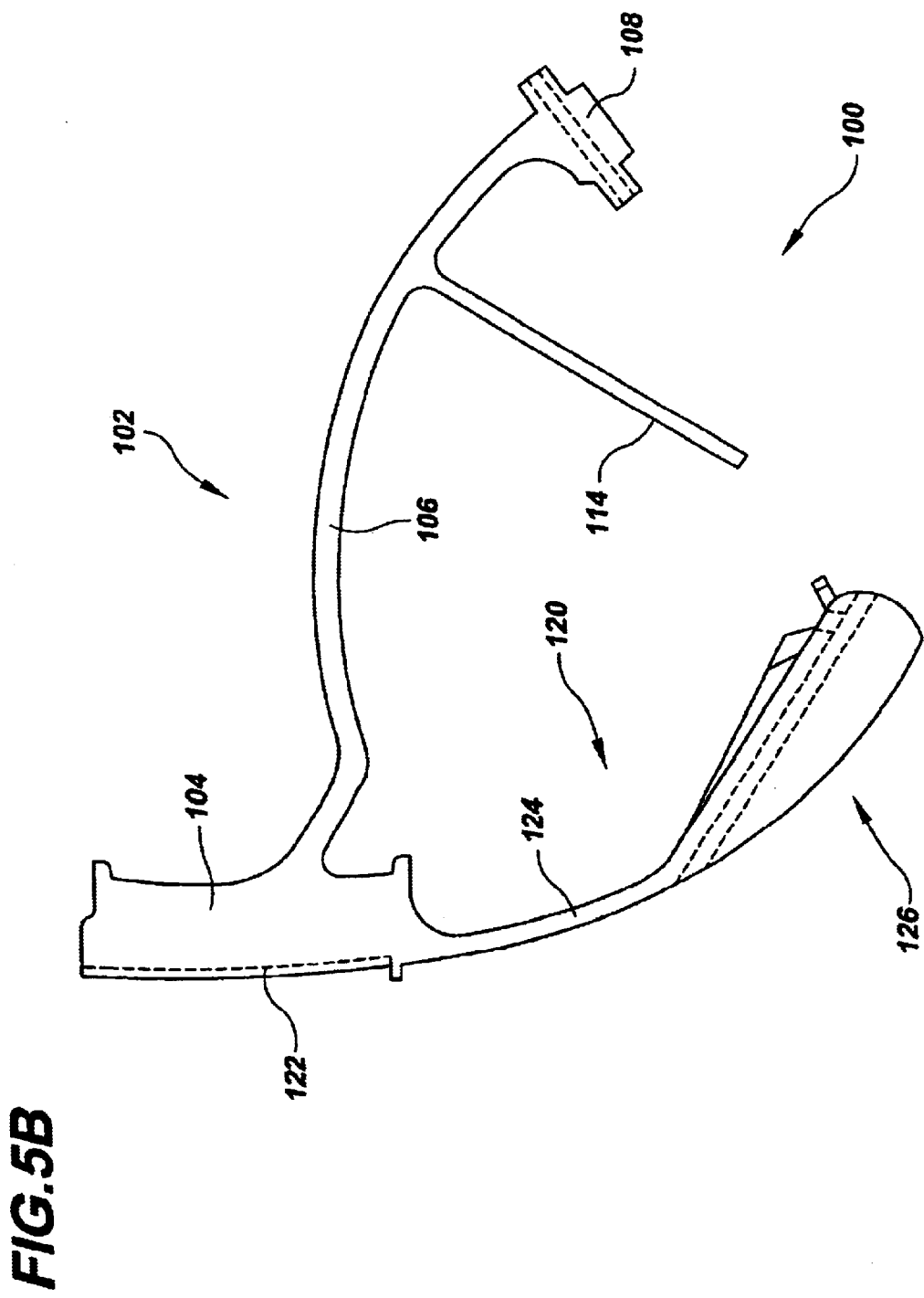

Although the discussed embodiments of the liquid application device 100 of the present invention have been disclosed as having the spray arm 102 and the furrow conditioner 120 as separate pieces, embodiments are envisioned wherein the spray arm 102 and furrow conditioner are of one piece construction (as shown in FIG. 5B). As well, embodiments of the liquid application device 100 are preferably constructed of materials such as, but not limited to, plastics, metals, nylon, composites, etc. As previously noted, embodiments of the liquid application device 100 are envisioned wherein one or both of the spray arm 102 and the furrow conditioner 120 are mounted to a portion of the planting assembly 10' frame 11, such as, but not limited to, the seed guide 14, as opposed to the seed tube 15.

It should be emphasized that the above-described embodiments of the present planting assembly and liquid application device for same, particularly, any "preferred" embodiments, are merely possible examples of implementations, merely set forth for a clear understanding of the principles of the planting assembly and liquid application device for same. Many variations and modifications may be made to the above-described embodiments of the planting assembly and liquid application device for same without departing substantially from the spirit and principles of the planting assembly. All such modifications and variations are intended to be included herein within the scope of this disclosure of the present planting assembly and liquid application device for same and protected by the following claims.

What is claimed is:

1. A planting assembly comprising:
   a furrow opening mechanism, a seed tube for directing a seed into a furrow, a liquid source, a liquid delivery conduit having a delivery end, and a furrow closing mechanism;
   a spray arm including a proximal end configured for mounting to the seed tube, a central portion, and a distal end, the proximal end being mounted to the seed tube and the central portion extending rearward such that the distal end is disposed above the furrow; and
   wherein the liquid delivery conduit is in fluid communication with the liquid source and the delivery end is adjacent to the distal end.

2. The planting assembly of claim 1, wherein the spray arm is configured such that the liquid is dispensed from the delivery end downwardly and forwardly toward the furrow aft of the seed tube.

3. A planting assembly comprising:
   a furrow opening mechanism, a seed tube for directing a seed into a furrow, a liquid source, a liquid delivery conduit having a delivery end, and a furrow closing mechanism;
   a spray arm including a proximal end configured for mounting to the seed tube, a central portion, and a distal end, the proximal end being mounted to the seed tube and the central portion extending rearward such that the distal end is disposed above the furrow; and
   a spray nozzle disposed on the distal end of the spray arm in fluid communication with the delivery end; and
   wherein the liquid delivery conduit is in fluid communication with the liquid source and the delivery end is adjacent to the distal end.

4. The planting assembly of claim 3, wherein the central portion of the spray arm is curved with a concave side disposed toward the furrow.

5. The planting assembly of claim 3, wherein the spray arm further comprises a deflector shield disposed on the central portion and extending downwardly toward the furrow.

6. The planting assembly of claim 3, wherein the spray arm is configured such that the liquid is dispensed from the delivery end substantially downwardly.

7. The planting assembly of claim 3, further comprising a furrow conditioner including an attachment end configured for attachment to the seed tube, a middle portion, and a conditioning head including a top portion and a pair of downwardly depending first and second portions, wherein the top portion is disposed between the first and second portions thereby forming a downwardly depending cavity, the cavity being of sufficient size to prevent contact by the conditioning head with the seed in a bottom of the furrow.

8. The planting assembly of claim 3, wherein the first and second portions of the conditioning head are configured such that the portions contact opposed side walls of the furrow while avoiding the seed in the bottom of the furrow.

9. The planting assembly of claim 3, further comprising a seed positioning device for positioning the seed within the furrow, the seed positioning device being removably secured to the seed tube.

10. The planting assembly of claim 3, wherein the spray arm is configured such that the liquid is dispensed downwardly and forwardly into the furrow aft of the seed positioning device.

11. The planting assembly of claim 3, wherein the liquid is selected from a group consisting of insecticides, herbicides, fungicides, nematicides, fertilizers, starters, inoculants, micronutrients, trace minerals, and water.

12. A planting assembly comprising:
    a furrow opening mechanism, a seed tube for directing a seed into a furrow having opposed sidewalls, a liquid source, a liquid delivery conduit having a delivery end, and a furrow closing mechanism;
    a furrow conditioner removably secured to the seed tube, the furrow conditioner including a conditioning head having a first portion and a second portion that are substantially parallel and form a cavity; and
    wherein the first and second portions contact adjacent of the opposed sidewalls of the furrow and the cavity is of sufficient size to prevent contact of the cavity with the seed in a bottom of the furrow.

13. The planting assembly of claim 12, further comprising a top portion disposed between the first and second portions, and the first and second portions are substantially downwardly depending.

14. The planting assembly of claim 13, wherein the delivery end of the liquid delivery conduit on the furrow conditioner is adjacent the conditioning head.

15. The planting assembly of claim 13, further comprising a spray arm including a proximal end and a distal end, wherein the proximal end is removably secured to the furrow conditioner, the distal end is disposed above the furrow, and the delivery end is adjacent the distal end.

16. The planting assembly of claim 13, further comprising a spray arm having a distal end, wherein the distal end is disposed above the furrow, the delivery end is adjacent to the distal end, and the spray arm and the furrow conditioner are of one-piece construction.

17. A method of application of a liquid to a furrow comprising the steps of:
    providing a planting assembly having a furrow opening mechanism, a seed tube for directing a seed into the furrow, a liquid source, a liquid delivery conduit having a delivery end, and a furrow closing mechanism;
    forming the furrow with the planting assembly;
    directing the liquid downwardly and forwardly into at least a portion of the furrow aft of the seed tube, thereby applying the liquid to the seed and the furrow; and
    closing the furrow over the seed.

18. The method of claim 17, further comprising the steps of:
    providing a seed positioning device; and
    positioning the seed in the furrow prior to applying the liquid.

19. The method of claim 17, wherein the liquid is selected from the group consisting of insecticides, herbicides, fungicides, nematicides, fertilizers, starters, inoculants, micronutrients, trace minerals, and water.

20. A planting assembly comprising:
    a frame including a seed guide, a furrow opening mechanism, a seed tube for directing a seed into a furrow, a liquid source, a liquid delivery conduit having a delivery end, and a furrow closing mechanism;
    a spray arm including a proximal end configured for mounting to a portion of the frame, a central portion, and a distal end, the proximal end being mounted to the frame and the central portion extending rearward such that the distal end is disposed above the furrow; and
    wherein the liquid delivery conduit is in fluid communication with the liquid source and the delivery end is adjacent to the distal end.

21. The planting assembly of claim 20, wherein the portion of the frame further comprises the seed guide.

22. A planting assembly comprising:
a frame including a seed guide, a furrow opening mechanism, a seed tube for directing seeds into a furrow having opposed sidewalls, a liquid source, a liquid delivery conduit having a delivery end, and a furrow closing mechanism;
a furrow conditioner removably secured to the frame, the furrow conditioner including a conditioning head having a first portion and a second portion that are substantially parallel and form a cavity; and
wherein the first and second portions contact adjacent of the opposed sidewalls of the furrow and the cavity is of sufficient size as to prevent contact of the cavity with the seed in a bottom of the furrow.

23. The planting assembly of claim 22, wherein the furrow conditioner is mounted to the seed guide.

24. A planting assembly comprising:
a frame including a seed guide, a seed positioning device, a seed tube for directing seeds into a furrow, a liquid source, and a liquid delivery conduit having a delivery end;
a spray arm including a proximal end and a distal end, the proximal end being adjacent to the seed positioning device and the distal end being disposed above the furrow; and
wherein the liquid delivery conduit is in fluid communication with the liquid source and the delivery end is adjacent to the distal end.

25. The planting assembly of claim 24, wherein the spray arm is removably secured to the seed positioning device.

26. The planting assembly of claim 24, wherein the spray arm and the seed positioning device are of one-piece construction.

27. A method of application of a liquid to a furrow comprising the steps of:
providing a planting assembly having a furrow opening mechanism, a seed tube for directing a seed into the furrow, a seed positioning device, a liquid source, a liquid delivery conduit having a delivery end, and a furrow closing mechanism;
providing a spray arm;
attaching the spray arm to the seed positioning device;
attaching the liquid delivery conduit to the spray arm;
forming the furrow with the planting assembly;
directing the liquid through the liquid delivery conduit into at least a portion of the furrow aft of the seed tube, thereby applying the liquid to the seed and the furrow; and
closing the furrow over the seed.

28. A liquid application device for use with a planting assembly having a furrow opening mechanism, a seed tube for directing a seed into a furrow, a liquid source, a liquid delivery conduit having a delivery end, and a furrow closing mechanism, the device comprising:
a spray arm including a proximal end configured for mounting to the seed tube, a central portion, and a distal end, the proximal end being mounted to the seed tube and the central portion extending rearward such that the distal end is disposed above the furrow; and
wherein the liquid delivery conduit is in fluid communication with the liquid source and the delivery end is adjacent to the distal end.

* * * * *